United States Patent
Cooke

(10) Patent No.: US 7,318,372 B2
(45) Date of Patent: Jan. 15, 2008

(54) APPARATUS FOR MAKING MULTIPLE BEVERAGES WITH REDUCED CROSS-CONTAMINATION

(75) Inventor: John Charles Cooke, Farnborough (GB)

(73) Assignee: Mars, Inc., McLean, VA (US)

( * ) Notice: Subject to any disclaimer, the term of this patent is extended or adjusted under 35 U.S.C. 154(b) by 542 days.

(21) Appl. No.: 10/953,633

(22) Filed: Sep. 29, 2004

(65) Prior Publication Data

US 2005/0066819 A1    Mar. 31, 2005

(30) Foreign Application Priority Data

Sep. 29, 2003  (GB)  ................... 0322757.6

(51) Int. Cl.
*A47J 31/00*     (2006.01)
(52) U.S. Cl. .............. 99/290; 99/295; 99/284; 99/302 R
(58) Field of Classification Search ............. 99/290, 99/295, 284, 302 R, 291
See application file for complete search history.

(56) References Cited

U.S. PATENT DOCUMENTS

| | | | |
|---|---|---|---|
| 4,649,809 A * | 3/1987 | Kanezashi | 99/290 |
| 5,072,660 A * | 12/1991 | Helbling | 99/280 |
| 5,840,189 A | 11/1998 | Sylvan et al. | |
| 6,155,158 A * | 12/2000 | Anson | 99/280 |
| 6,805,042 B2 * | 10/2004 | Mordini et al. | 99/299 |
| 2002/0048621 A1* | 4/2002 | Boyd et al. | 426/77 |
| 2002/0148357 A1 | 10/2002 | Lazaris et al. | |

FOREIGN PATENT DOCUMENTS

| | | |
|---|---|---|
| EP | 0272922 | 6/1988 |
| EP | 0179641 | 1/1990 |
| EP | 0468079 | 9/1996 |
| EP | 0512468 | 1/1997 |
| EP | 0821906 | 2/1998 |
| WO | WO 94/01344 | 1/1994 |
| WO | WO 02/19875 | 3/2002 |
| WO | WO 02/087400 | 11/2002 |
| WO | WO 03/053200 | 7/2003 |

* cited by examiner

*Primary Examiner*—Reginald L. Alexander
(74) *Attorney, Agent, or Firm*—Fulbright & Jaworski; Jan K. Simpson

(57) ABSTRACT

A beverage making apparatus for preparing a plurality of different beverages, the apparatus comprising: a receptacle station for receiving a receptacle for the beverage; a capsule receiving station having walls defining a cavity for receiving a capsule containing a beverage making ingredient; an inlet for introducing water into a capsule in the station to produce a beverage; and a beverage outlet for directing an outflow of beverage from the cavity to the receptacle station; wherein the apparatus comprises a plurality of different beverage outlets that are interchangeable for making different beverages.

6 Claims, 2 Drawing Sheets

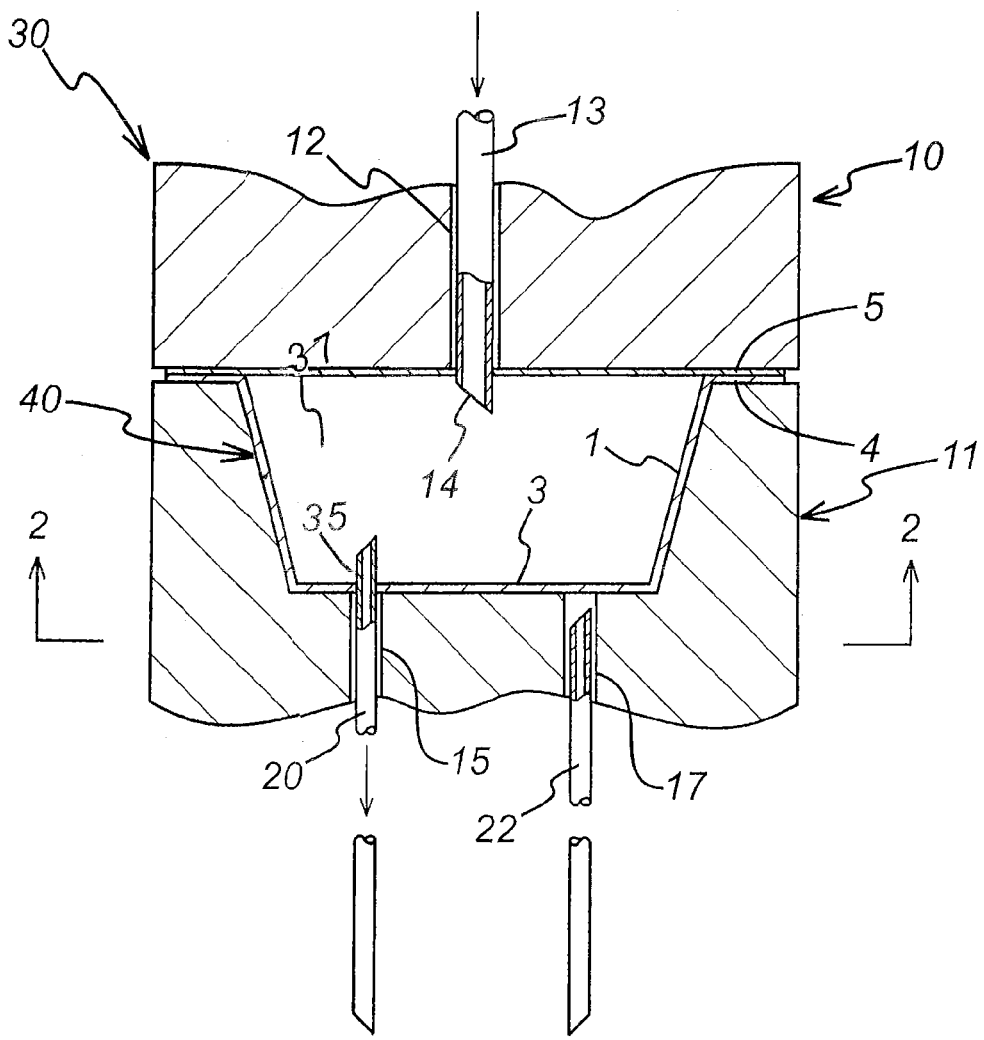
FIG. 1
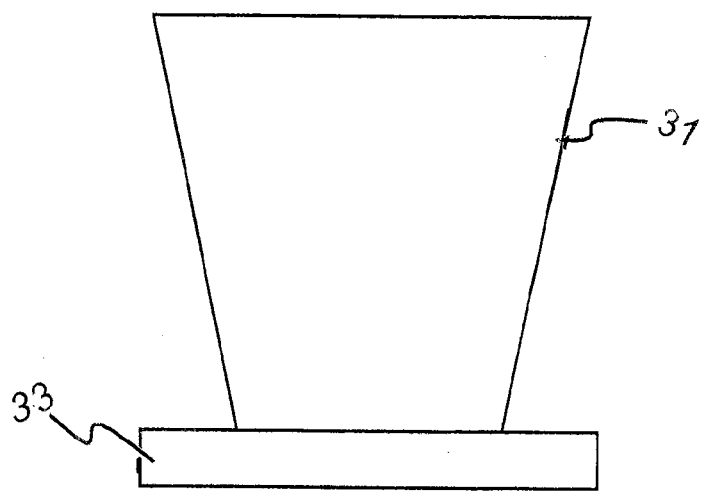

APPARATUS FOR MAKING MULTIPLE BEVERAGES WITH REDUCED CROSS-CONTAMINATION

CROSS-REFERENCE TO RELATED APPLICATIONS

This application claims priority to GB 0322757.6 filed Sep. 29, 2003.

TECHNICAL FIELD

The present invention relates to beverage making equipment for making a plurality of different beverages with reduced cross-contamination between the different beverages.

BACKGROUND OF THE INVENTION

A number of beverage making systems are known in which the beverage is made by inserting a capsule of a beverage making ingredient, such as ground coffee, into a predetermined beverage making station of the beverage making apparatus. The apparatus then injects water into the capsule, where it dissolves or is infused by the beverage making ingredient to form the beverage. The beverage flows out of the capsule through a suitable outlet, which may be simply an opening or perforation in the capsule, or it may comprise an outlet tube that pierces an outlet region of the capsule. Beverage making systems of this general type are described for example WO94/01344, EP-A-0512468 and EP-A-0468079 (all Nestle), in U.S. Pat. No. 5,840,189 (Keurig), in EP-A-0272922 (Kenco), in EP-A-0821906 (Sara Lee) and in EP-A-0179641 and WO02/19875 (Mars), the entire contents of all of which are incorporated herein by reference.

A difficulty with many beverage making systems is cross-contamination between beverages of different types made in the same machine. Another difficulty is maintenance of hygienic conditions when residues of beverage are left on any part of the machine, such as an outlet tube, between beverage making operations. These difficulties explain in part the continuing popularity of in-cup vending systems, such as that sold under the Registered Trade Mark KLIX. The in-cup vending systems are based on stacks of disposable cups, each containing a portion of beverage making ingredients in its base. In use, the stack is loaded into the dispenser of a vending machine. In response to a vending command, the machine automatically splits a cup from the bottom of the stack and fills it with hot water to form the desired beverage. Cross-contamination is thereby avoided, but the machines tend to be bulky because of the large volume of the stored cup stacks. Also, the in-cup vending systems are not so well suited to the preparation of infused beverages, such as ground coffee and leaf tea.

EP-A-0179641 and WO02/19875 avoid the problem of cross-contamination by using a part of the capsule itself to form the outlet for the beverage, so that the beverage does not directly contact any part of the beverage making apparatus other than the capsule. This solution may not be appropriate for all capsule formats.

The present invention provides a flexible and simple means to overcome the above-identified problems of beverage making equipment, and further provides related advantages.

BRIEF SUMMARY OF THE INVENTION

The present invention provides a beverage making apparatus for preparing a plurality of different beverages, said apparatus comprising: a receptacle station for receiving a receptacle for the beverage; a capsule receiving station having walls defining a cavity for receiving a capsule containing a beverage making ingredient; an inlet for introducing water into a capsule in the said station to produce a beverage; and a beverage outlet for directing an outflow of beverage from the cavity to the receptacle station; wherein the apparatus comprises a plurality of different beverage outlets that are interchangeable for making different beverages. In certain embodiments, the receptacle station for receiving a receptacle is optional.

BRIEF DESCRIPTION OF THE DRAWINGS

For a more complete understanding of the present invention, reference is now made to the following descriptions taken in conjunction with the accompanying drawing, in which:

FIG. 1 shows a schematic cross-sectional view through a portion of a beverage brewing apparatus, specifically the capsule receiving station, according to the present invention;

DETAILED DESCRIPTION OF THE INVENTION

Figure 2:
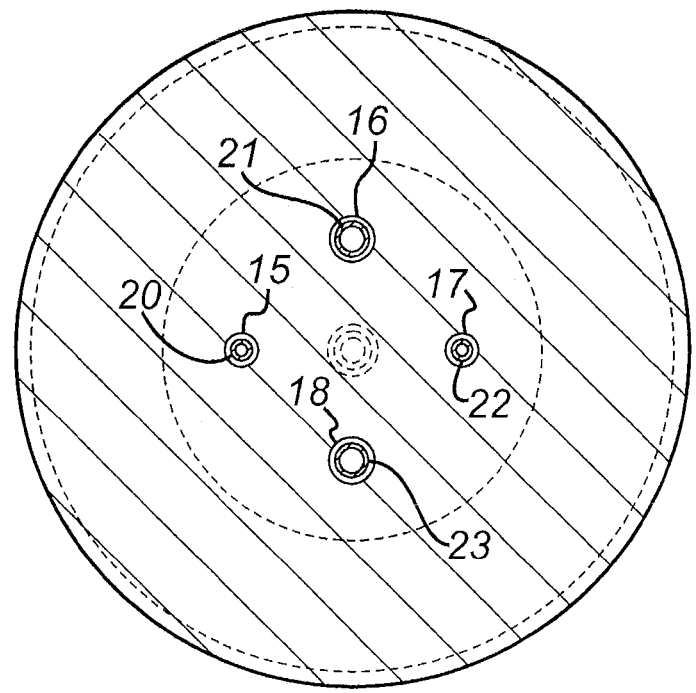
FIG. 2 shows a schematic cross-sectional view on 2-2 of FIG. 1.

The beverage making apparatus of the present invention may be a beverage vending apparatus incorporating payment means. The apparatus may be fully automatic, that is to say it may store the beverage making capsules and select a capsule and insert the capsule into the capsule station and a receptacle into the receptacle station automatically in response to a beverage making instruction from an operator. In other embodiments, the apparatus may be semi-automatic. That is to say the capsule at least is inserted into the capsule station by the operator, for example the operator may select a capsule from a storage and display unit next to the apparatus, and insert the capsule into the capsule station when initiating the beverage making process.

The receptacle 31 will normally be a cup, such as a disposable cup, that is inserted into the receptacle station 33 to receive the beverage produced by the apparatus. Any type of receptacle station known in the art can be used in the present invention with the brewing apparatus. Such receptacle stations are described in WO02/087400, which is incorporated herein by reference in its entirety. The receptacle station can be a shelf or an alcove onto or into which the cup is placed or dispensed, such as in a conventional FLAVIA® or KLIX® machine.

Yet further, the apparatus may contain a plurality of the receptacles, one of which is introduced automatically into the receptacle station in response to a command to make a beverage. For example, the apparatus may be adapted to store a stack of nested cups, and further comprise a cup splitting mechanism to separate a cup from the bottom of the stack and feed it to the receptacle station in response to a beverage making instruction.

Referring to FIG. 1, the capsule receiving station 30 is a region of the brewing apparatus that is adapted to receive and retain a beverage making capsule during the step of making the beverage from the capsule. The capsule receiving station may comprise a clamp 10, 11 to grip the capsule 40, for example a region of the capsule such as a flange provided on the capsule, during the step of making the beverage. The capsule receiving station may be adapted to apply pressure to the capsule during beverage making, and/or to support the capsule against bursting when it is pressurized by water injection during beverage making. Any of the clamps or other capsule receiving spaces described in WO94/01344, EP-A-0512468, EP-A-0468079, U.S. Pat. No. 5,840,189, EP-A-0272922, EP-A-0821906, EP-A-0179641 and/or WO02/19875 would be suitable, each of which is incorporated herein by reference in its entirety.

The apparatus is adapted to brew beverages from a capsule containing a beverage brewing ingredient, such as ground coffee or leaf tea. Capsule 40 can also be referred to as a brewing capsule. The capsule 40 comprises a thermoformed body having tapered side walls 1 defining a cavity 37, a base 3 and a flange 4 extending around the top of the body. A plastics/foil laminate flexible film 5 seals the capsule by bonding to the flange 4.

The capsule receiving station 30 according to the present invention comprises upper and lower clamp elements 10, 11 that are reciprocally movable to clamp the capsule 1 tightly therebetween, as shown in FIG. 1. Upper jaw element 10 has a central aperture 12, in which is located a reciprocally movable water injector 13. The water injector 13 has a profiled tip 14 that penetrates only a short distance through the laminated foil sheet 5, thereby permitting water injection with minimal cross-contamination as described in US 2004/0025701A, the entire content of which is incorporated herein by reference.

Lower clamp element 11 has four bores 15, 16, 17, 18 therein, as shown in FIG. 2. Four outlet tubes 20, 21, 22, 23 are, respectively, reciprocally movable in the bores under the control of the beverage brewing apparatus. In use, one of the outlet tubes, for example tube 20 as shown in FIG. 1, is moved upwardly to pierce the base 4 of the capsule 1 so that a beverage made in the capsule 1 can exit the capsule through the selected outlet tube 20. By using different outlet tubes for different beverages it will be appreciated that cross-contamination can be minimized. It can also be seen that the outlet tubes 20,22 have a narrow diameter (e.g. about 1 mm) for forming a jet of the beverage escaping from the capsule. This jet can be used to achieve foaming of the beverage in a receptacle by high-shear mixing. The narrowbore tubes 20,22 are therefore typically selected for capsules containing foamable beverage ingredients such as milk or chocolate. The narrow outlet tubes may also be selected for high-pressure products, such as espresso coffee products, in order to achieve a high back pressure. In contrast, the wider-diameter outlet tubes 21,23 are typically selected for conventional coffee or tea capsules.

It will be appreciated that in certain embodiments the base 3 of the brewing capsule may be provided with suitable regions of weakness to assist penetration by the outlet tubes. It will further be appreciated that in certain embodiments the lower clamp element may be provided with one or more sealing features to minimize leakage of the beverage in the vicinity of the outlet tube that is in use. For example, an elastomeric sealing liner may be provided on the lower surface of the lower clamp element 11 that contacts the base 3 of the capsule in use.

Figure 3:
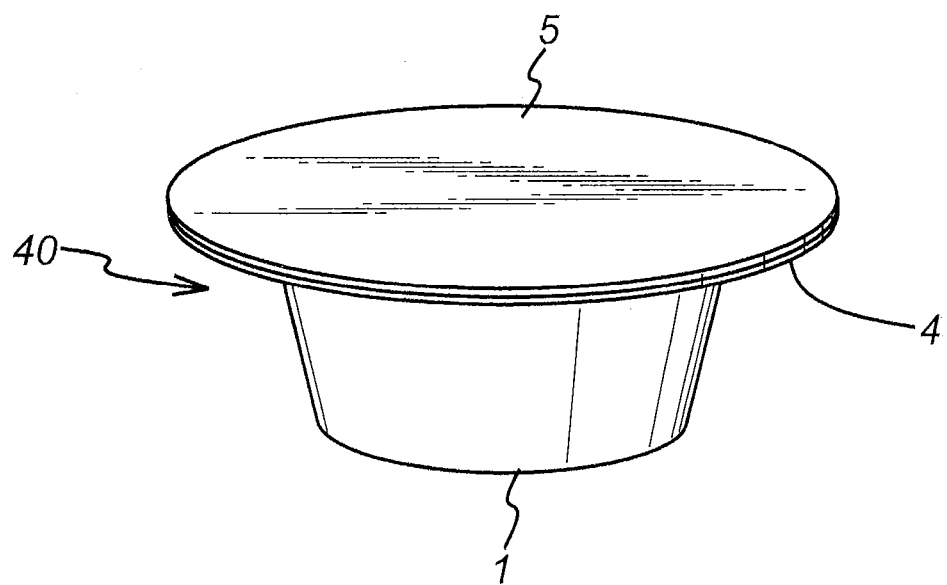
FIG. 3 is a perspective view of a capsule used in the beverage brewing apparatus.

Capsules 40 (FIG. 3) for use in the apparatus according to the present invention include any fully enclosed packages containing the beverage making ingredient. Preferably, the capsules are substantially air- and moisture-impermeable.

The capsule contains a beverage-making ingredient. Suitable ingredients include tea (leaf or instant), coffee (ground or instant), drinking chocolate (powder or concentrate), beverage whitener (solid or liquid), or a soft drink concentrate such as a water soluble or water dispersible syrup or sweetened powder concentrate. In certain embodiments, the beverage making ingredient is an infusible beverage brewing ingredient, such as leaf tea or ground coffee. In such embodiments the capsules may further comprise a filter sheet inside the capsules and bonded to an internal surface of the capsules. Typically, the amount of ingredient in the capsules is sufficient for the preparation of one portion of beverage, i.e. from about 25 to about 500 ml, preferably from about 100 ml to about 250 ml. For example, the package may contain from about 2 g to about 25 g of ground coffee or from about 1 g to about 9 g of leaf tea.

Typically, each capsule comprises a plastics sheet (e.g. thermoformed or injection molded sheet) and/or flexible film material. The sheet or flexible film material will usually be a laminate comprising two or more of the following layers: a thermoplastic sealant layer for bonding the sheet to other members of the package; a substantially gas-impermeable barrier layer, which preferably is a metal film such as aluminum film; adhesion layers to improve adhesion between other layers of the laminate; structural layers, for example to provide puncture resistance; and/or a printing substrate layer. The structural layers could be made of polyolefins, polyester, nylons, or other polymers as is well known in the art.

In one group of embodiments, the capsules may comprise two similar or identical sheets of flexible film material bonded together around a margin to form a film sachet or capsule. In another group of embodiments the capsules may comprise a first sheet that has been formed, e.g. by thermoforming, into a cup or bowl shape with a flanged rim, and a second sheet that is bonded across the flanged rim to form the capsule. For example, the first sheet may be a relatively stiff thermoplastic sheet that has been thermoformed into a generally frustoconical shape with a flanged rim, and the second sheet is a flat sheet, which may be of flexible film material, that is bonded across the flanged rim. Suitable capsule embodiments are described for example in the references listed above.

The water inlet is usually one or more injection tubes, each of which may be sharpened at its tip to pierce the capsule. The inlet may be movable in a reciprocating motion to pierce the capsule and then retract to allow the capsule to be removed after use. Especially suitable injection tubes are described in WO-A-03053200, the entire content of which is incorporated herein by reference. The apparatus preferably further comprises a supply of water to the inlet, optionally for supplying water at temperatures of up to about 100° C. and pressures of about 0.1 to about 10 bar, for example from about 0.2 bar to about 2 bar, in continuous or pulsed fashion.

The apparatus according to the present invention further comprises one or more outlets for directing the beverage from the capsule in the capsule station to the receptacle. The outlets 20, 21, 22, 23 may be in the form of conduits, formed from solid or flexible material, for example tubes or channels. In suitable embodiments, the beverage outlets comprise an outlet tube 20, 22, and in these embodiments the apparatus may be adapted to insert a first end 35 of a selected outlet tube 22, 22 into an outlet region 15, 16, 17, 18 of the cavity 37 during preparation of a beverage and to retract the first end 35 of the selected outlet tube from the outlet region of the cavity 37 after preparation of the beverage from each capsule is completed. In these embodiments, the tip of the tube may pierce an outlet region of the capsule, and the tube may have a sharpened tip for this purpose. In other embodiments, the outlets may be formed as channels in an outlet region of the capsule and or outlet channels in the jaws of a clamp that closes an outlet region of the capsule station, as described for example in EP-A-0821906 or WO02/19875, each of which is incorporated herein by reference in its entirety.

It is a characterizing feature of the present invention that the apparatus comprises more than one interchangeable outlet. In other words, the apparatus contains more than one outlet (e.g. more than one outlet tube or manifold, or more than one clamp for the outlet region of the capsule). Each outlet is demountable from the capsule retaining station and replaceable by another outlet. The replacement of the outlets may be carried out by hand by an operator, or it may be carried out automatically by the apparatus in response to a beverage making instruction. The multiple outlets may be all of the same type, for example one outlet may be provided for each beverage to be made by the machine in order to prevent cross-contamination.

In certain embodiments, the outlets may be of different types in order to optimize the outlet configuration for each beverage to be prepared. For example, a small-diameter outlet may be provided for the preparation of espresso coffee, in order to maintain a high back pressure in the capsule. A jet-forming outlet may be provided for forming a frothed beverage in the receptacle, as described in WO02/087400, the entire content of which is incorporated herein by reference. Specifically, in these embodiments, the beverage outlets comprise an outlet tube, and at least one of the outlet tubes is shaped and configured to produce a jet of liquid having a diameter of from about 0.5 mm to about 2 mm.

In certain embodiments, more than one outlet may be used in the preparation of a single beverage, for example a jet-forming outlet to form a foamed milk followed by a high-back-pressure outlet to form an espresso "shot" for combination with the foamed milk to provide a cappuccino coffee.

In certain embodiments, the outlets may be disposable outlets and the apparatus is adapted to use a new disposable outlet in response to each new beverage making instruction, in order to prevent cross-contamination and maintain hygiene. In other embodiments, the apparatus may further comprising an outlet cleaning station for cleaning a selected beverage outlet after use.

As already noted, in certain embodiments the apparatus is adapted to select a predetermined one or more of said outlets automatically in response to a beverage selection made by an operator of the apparatus. In these embodiments, the apparatus may comprise a pack recognition system, and the said beverage outlets may be selected automatically by the apparatus in response to the output of the pack recognition system.

In a second aspect, the present invention provides beverage making system comprising a beverage making apparatus according to the invention as hereinbefore defined, and a plurality of different beverage making capsules for use in the said apparatus.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A beverage making apparatus for preparing a plurality of different beverages, said apparatus comprising:
   a receptacle station for receiving a receptacle for the beverage;
   a capsule receiving station having walls defining a cavity for receiving a capsule containing a beverage making ingredient;
   an inlet for introducing water into a capsule in the said station to produce a beverage; and
   a beverage outlet for directing an outflow of beverage from the cavity to the receptacle station;
   wherein the apparatus comprises a plurality of different beverage outlets that are interchangeable for making different beverages, each of said outlets comprising an outlet tube having a respective first end for insertion into an outlet of the cavity during preparation of a beverage.

2. A beverage making apparatus according claim 1, wherein the beverage outlets comprise an outlet tube, and at least one of the outlet tubes is shaped and configured to produce a jet of liquid having a diameter of from about 0.5 mm to about 2 mm.

3. A beverage making apparatus according to claim 1, wherein at least one of said outlets is a disposable outlet and the apparatus is adapted to use a new disposable outlet in response to each new beverage making instruction.

4. A beverage making system comprising:
   a receptacle station for receiving a receptacle for the beverage;
   a capsule receiving station having walls defining a cavity for receiving a capsule containing a beverage making ingredient;
   an inlet for introducing water into a capsule in the said station to produce a beverage;
   wherein the apparatus comprises a plurality of different beverage outlets that are interchangeable for aiming different beverages, each of said outlets comprising an outlet tube having a respective first end for insertion into an outlet region of the cavity during preparation of a beverage; and
   a plurality of different beverage making capsules for use in said apparatus.

5. A beverage making system according to claim 4, wherein the beverage making capsules comprise a generally cup-shaped body having a cover bonded over the top of the cup.

6. A beverage making system according to claim 4, wherein the content of the plurality of different beverage making capsules is selected from a group consisting of tea, coffee, drinking chocolate, beverage whitener, and soft drink concentrate.

* * * * *